US006782295B2

(12) United States Patent
Martz, Jr. et al.

(10) Patent No.: US 6,782,295 B2
(45) Date of Patent: Aug. 24, 2004

(54) OPTIMIZING THE AVAILABILITY OF A BUFFERED INDUSTRIAL PROCESS

(75) Inventors: Harry F. Martz, Jr., Los Alamos, NM (US); Michael S. Hamada, Los Alamos, NM (US); Arthur J. Koehler, Middletown, OH (US); Eric C. Berg, Maineville, OH (US)

(73) Assignee: The Regents of the University of California, Los Alamos, NM (US)

( * ) Notice: Subject to any disclaimer, the term of this patent is extended or adjusted under 35 U.S.C. 154(b) by 422 days.

(21) Appl. No.: 09/848,817

(22) Filed: May 3, 2001

(65) Prior Publication Data

US 2002/0010521 A1 Jan. 24, 2002

Related U.S. Application Data

(60) Provisional application No. 60/202,007, filed on May 4, 2000.

(51) Int. Cl.[7] ............................................. G05B 13/02
(52) U.S. Cl. ............................. 700/28; 700/29; 700/32; 700/33; 700/99; 700/100; 703/2; 703/6
(58) Field of Search ............................. 700/28, 29, 32, 700/33, 99, 100, 103, 228, 286; 703/2, 6; 705/7, 8; 706/13

(56) References Cited

U.S. PATENT DOCUMENTS

| | | | | |
|---|---|---|---|---|
| 4,796,194 A | * | 1/1989 | Atherton | 700/103 |
| 5,222,192 A | * | 6/1993 | Shaefer | 706/13 |
| 5,229,948 A | * | 7/1993 | Wei et al. | 700/99 |
| 5,373,451 A | * | 12/1994 | Furukawa | 700/228 |
| 5,617,342 A | * | 4/1997 | Elazouni | 703/6 |
| 5,819,232 A | * | 10/1998 | Shipman | 705/8 |
| 6,018,716 A | * | 1/2000 | Denardo et al. | 705/7 |
| 6,110,214 A | | 8/2000 | Klimasauskas | 703/2 |
| 6,181,984 B1 | | 1/2001 | Sawa et al. | 700/286 |

OTHER PUBLICATIONS

Williams, E and Ahitov, I, Scheduling Analysis Using Discrete Event Simulation, Apr. 8, 1996–Apr. 11, 1996, Simulation Symposium, 1996, 148–154.*
Tullis et al, Successful Modeling of a Semiconductor R&D Facility, May 21, 1990–May 23, 1990, Semiconductor Manufacturing Science Symposium, 1990, 26–32.*
Miller, D, Simulation of a Semiconductor Manufacturing Line, Oct. 1990, ACM Press, vol. 33, Issue 10, 98–108.*
Vaidyanathan, B and Park, Y, Application of Discrete Event Simulation in Production Scheduling, 1998, Proceedings of the 1998 Winter Simulation Conference, 1998, 965–971.*

(List continued on next page.)

*Primary Examiner*—Ramesh Patel
*Assistant Examiner*—Joshua C Liu
(74) *Attorney, Agent, or Firm*—Ray G. Wilson

(57) ABSTRACT

A computer-implemented process determines optimum configuration parameters for a buffered industrial process. A population size is initialized by randomly selecting a first set of design and operation values associated with subsystems and buffers of the buffered industrial process to form a set of operating parameters for each member of the population. An availability discrete event simulation (ADES) is performed on each member of the population to determine the product-based availability of each member. A new population is formed having members with a second set of design and operation values related to the first set of design and operation values through a genetic algorithm and the product-based availability determined by the ADES. Subsequent population members are then determined by iterating the genetic algorithm with product-based availability determined by ADES to form improved design and operation values from which the configuration parameters are selected for the buffered industrial process.

17 Claims, 8 Drawing Sheets

OTHER PUBLICATIONS

Gen et al., "GA–based Reliability Design: State–of–the–Art Survey," Computers & Industrial Engineering 37, 1999, pp. 151–155.

Coit et al., "Reliability Optimization of Series–Parallel Systems Using a Genetic Algorithm," IEEE Transactions on Reliability, vol. 45, No. 2, Jun. 1996, pp254–260.

Coit et al., "Considering Risk Profiles in Design Optimization for Series–Parallel Systems," 1997 Proceedings Annual Reliability and Maintainability Symposium, pp. 271–277.

Painton et al., "Genetic Algorithms in Optimization of System Reliability," IEEE Transactions on Reliability, vol. 44, No. 2, pp. 172–178, Jun. 1995.

Levitin et al., "Joint Redundancy and Maintenance Optimization for Multistate Series–Parallel Systems," Reliability Engineering & System Safety, 64, pp. 33–42, 1999.

Ramachandran et al., "Genetics Based Redundancy Optimization," Microelectron. Reliab., vol. 37, No. 4, pp. 661–663, 1997.

Levitin et al., "Structure Optimization of Power System with Bridge Topology," Electric Power Systems Research, 45, pp. 201–208.

Levitin et al., "Optimal Multistage Modernization of Power System Subject to Reliability and Capacity Requirements," Electric Power Systems Research, 50, pp. 183–190, 1999.

Gen et al., "Optimal Design of System Reliability Using Interval Programming and Genetic Algorithms," Computers ind. Engng. vol. 31, No. 1/2, pp. 237–240, 1996.

Yang et al., "Application of Genetic Algorithm for Reliability Allocation in Nuclear Power Plants," Reliability Engineering & System Safety, 65, pp. 229–238, 1999.

Komar et al., "Genetic–Algorithm–Based Reliability Optimization for Computer Network Expansion," IEEE Transactions on Reliability, vol. 44, No. 1, Mar. 1995.

* cited by examiner

OPTIMIZING THE AVAILABILITY OF A BUFFERED INDUSTRIAL PROCESS

This application claims the benefit of Provisional Application No. 60/202,007, filed May 4, 2000.

STATEMENT REGARDING FEDERAL RIGHTS

This invention was made with government support under Contract No. W-7405-ENG-36 awarded by the U.S. Department of Energy. The government has certain rights in the invention.

BACKGROUND OF THE INVENTION

Many processes for handling, processing, and manufacturing discrete products consist of a series (or set) of sequential process operations (or subsystems) which are de-coupled by means of in-process storage buffers. Such a process, along with its operating rules, is referred to herein as a buffered industrial process (BIP). For example, a commercial bottling operation represents such a process, while the manufacture of such things as computer chips represents yet another example of a buffered industrial manufacturing system. Non-manufacturing systems may include such systems as mail sorting and handling, high speed systems for inventory selection and movement, and the like. In addition, subsystems within the overall system may contain one or more parallel production facilities, or "lanes," which perform an identical function.

FIG. 1 illustrates a typical BIP having $m \geq 2$ subsystems 12, 14, 16 and m-1 buffers 18, 22, 24 in which the $i^{th}$ subsystem has $n_i \geq 1$ lanes. Note that each pair of subsystems is separated by a single buffer (e.g., buffer 18) that accepts the combined output of all the lanes supplying it and distributes its products to all the lanes that it supplies, i.e., a "common buffer," as used herein.

The design of a BIP is described by its configuration and operating rules. "Configuration" means the number of lane and buffer subsystems, the number of lanes in each manufacturing subsystem, whether or not the lanes are coupled within a given subsystem, and the buffer capacities. For each subsystem, the lanes have specified failure time ("uptime") distributions relative to particular lane speeds and repair time ("downtime") distributions. Also, lane failure times can be represented as being either "good-as-new" (i.e., failure times reset on a lane failure) or "good-as-old" (i.e., failure times accumulate after lane failure). For purposes of the discussion, it will be assumed that buffers cannot fail, although buffer failures can be accommodated.

Other lane boundary conditions include the "maximum speed" at which a given lane can be operated, the "probability of a false lane restart" (i.e., the probability of a loss event that occurs quickly relative to the expected life of the system), and the "time required for a successful restart." A corresponding buffer boundary condition is the "starting quantity in the buffer." Suppose "minutes" are the desired time units of interest. Then a BIP also has a required "production limit specification" expressed as the maximum number of products that can be made or handled by the process per minute.

The operating rules for a BIP refer to the "buffer trigger levels," "lane speeds" and "lane rules." "Lane rules" are the rules for operating the lanes within a given subsystem; for example, whether or not lanes can be repaired on the fly (i.e., remaining lanes continue to operate after a lane failure and during repair), a repaired lane can be restarted on the fly, or the lanes must wait for a common restart after all lanes have stopped.

The "availability" of a BIP is a product-based availability defined here as the proportion of the number of products made or handled in a specified period of time relative to the potential number of products that could have been made or handled if the process had run without any lane failures during this period. An important problem is how to find configuration and operating rules (that is, BIP designs) that yield high product-based availability. The present invention is directed to this problem. In accordance with our invention, a discrete-event simulation determines the availability of a given BIP design and a genetic algorithm (GA) mutates those BIP designs having high availability until further genetic improvements cease.

The use of a GA to optimize the reliability of a system has been considered by many authors. Gen & Kim (1999) [3] present an excellent state-of-the-art survey on the use of GA-based approaches for various reliability design problems. Coit & Smith (1996) [1] use a GA to optimize the reliability of a series-parallel system. Coit & Smith (1997) [2] discuss a GA to optimize a series-parallel system in which risk profiles of both designer and user are explicitly considered. Painton & Campbell 10 (1995) [13] and Levitin & Lisnianski (1999) [10] also use a GA to optimize the reliability of a series-parallel system. Kumar, Pathak & Gupta (1995) [8] use a GA to optimize the reliability of a computer-network expansion model, while Gen & Cheng (1996) [4] use a GA to optimize the reliability of a redundant system at the subsystem level. Likewise, Ramachandran, Sivakumar & Sathiyanarayanan (1996) [14] take a genetics-based approach to redundancy optimization. While there are many real-world applications of GAs in reliability, several interesting real-world reliability applications in nuclear power plant and power system design are considered in Levitin & Lisnianski (1998) [9] and Levitin & Lisnianski (1999) [11]. However, a GA has not been used to optimize the product-based availability of a complex system, such as a BIP in accordance with our invention.

REFERENCES INCORPORATED HEREIN

[1] D. W. Coit, A. E. Smith, "Reliability optimization of series-parallel systems using a genetic algorithm", IEEE Trans. Reliability, vol 45, June 1996, pp 254–260.

[2] D. W. Coit, A. E. Smith, "Considering risk profiles in design optimization for series-parallel systems", 1997 Proc. Annual Reliability & Maintainability Symposium, 1997, pp 271–277.

[3] M. Gen, J. R. Kim, "GA-based reliability design: state-of-the-art survey", Computers & Ind. Eng., vol 37, 1999, pp 151–155.

[4] M. Gen, R. Cheng, "Optimal design of system reliability using interval programming and genetic algorithms", Computers & Ind. Eng., vol 31, 1996, pp 151–155.

[5] D. E. Goldberg, Genetic Algorithms in Search, Optimization and Machine Learning, 1989; Addison-Wesley.

[6] N. L. Johnson, S. Kotz, Distributions in Statistics: Continuous Univariate Distributions—January 1970; John Wiley.

[7] N. L. Johnson, S. Kotz, Distributions in Statistics: Continuous Multivariate Distributions, 1972; John Wiley.

[8] A. Kumar, R. M. Pathak, Y. P. Gupta, "Genetic-algorithm-based reliability optimization for computer network expansion", IEEE Trans. Reliability, vol 44, March 1995, pp 63–72.

[9] G. Levitin, A. Lisnianski, "Structure optimization of power system with bridge topology", Elec. Power Sys. Res., vol 45, 1998, pp 201–208.

[10] G. Levitin, A. Lisnianski, "Joint redundancy and maintenance optimization for multistate series-parallel systems", Rel. Eng. & Sys. Safety, vol 64, 1999, pp 33–42.

[11] G. Levitin, A. Lisnianski, "Optimal multistage modernization of power system subject to reliability and capacity requirements", Elec. Power Sys. Res., vol 50, 1999, pp 183–190.
[12] Z. Michalewicz, Genetic Algorithms+Data Structures= Evolution Programs, 1992; Springer-Verlag.
[13] L. Painton, J. Campbell, "Genetic algorithms in optimization of system reliability", IEEE Trans. Reliability, vol 44, June 1995, pp 172–178.
[14] V. Ramachandran, V. Sivakumar, K. Sathiyanarayanan, "Genetics based redundancy optimization", Microelectron. Reliab., vol 37, 1996, pp 661–663.
[15] J. E. Yang, M. J. Hwang, T. Y. Sung, Y. Jin, "Application of genetic algorithm for reliability allocation in nuclear power plants", Rel. Eng. & Sys. Safety, vol 65, 1999, pp 229–238.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention includes a computer-implemented process for determining optimum configuration parameters for a buffered industrial process. A population is initialized by randomly selecting a first set of design and operation values associated with subsystems and buffers of the buffered industrial process to form a set of operating parameters for each member of the population. An availability discrete event simulation (ADES) is performed on each member of the population to determine the product-based availability of each member. A new population is formed having members with a second set of design and operation values related to the first set of design and operation values through a genetic algorithm and the product-based availability determined by the ADES. Subsequent population members are then determined by iterating the genetic algorithm with product-based availability determined by ADES to form improved sets of design and operation values from which the configuration parameters are selected for the buffered industrial process.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

Figure 2:
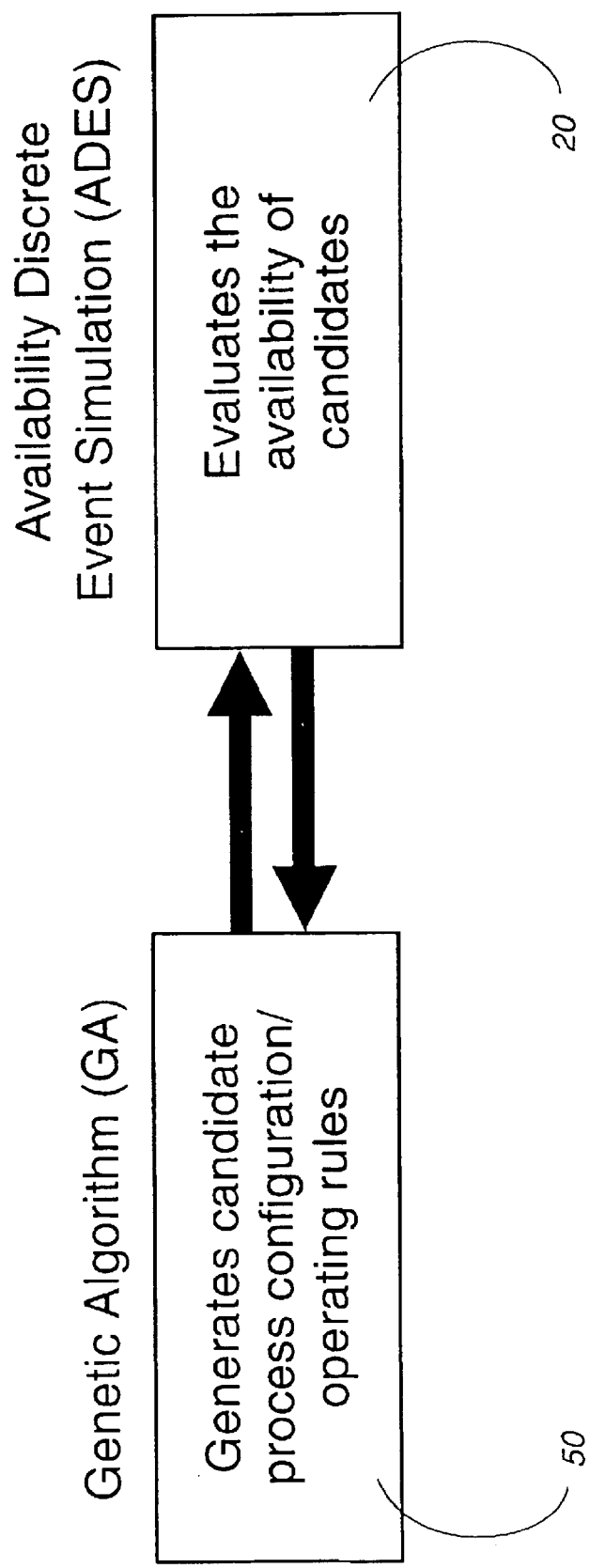
FIG. 2 is a block diagram overview of the process of the present invention.

As shown in FIG. 2, the present invention uses a discrete-event simulation 20 to estimate the availability of a given BIP design. A GA 50 then searches for those designs having high availability. The process shown in FIGS. 2, 3, 4, and 5 is implemented on a computer system, which may be a personal computer, networked computers, large serial or parallel main frame computers, and the like. An exemplary system is developed using the combination of a GA and discrete-event simulation to form mutations whose availability is further assessed by discrete-event simulation. The following process parameter configuration notation/definitions are used in the exemplary discussion and the operating rules/assumptions of the process shown in FIG. 4. While the discussion is primarily in terms of a manufacturing system for producing products, the general applicability of the process for buffered systems will be understood by persons skilled in the art who may make many adaptations to form equivalent processes for material handling and processing.

| | NOTATION |
|---|---|
| m | total number of manufacturing subsystems |
| $n_i$, NoLanes | number of lanes in the ith manufacturing subsystem |
| Lane ij | the jth lane in the ith manufacturing subsystem |
| $t_{ij}$ | failure time of Lane ij |
| ProductionLimit | maximum number of products to be produced by the process per minute |
| GoodAsOld | lane repair characteristic (0-no, 1-yes) |
| weibd($\bullet$; $\alpha$, $\beta$) | Weibuld probability distribution function (pdf) with scale parameter $\alpha$ and shape parameter $\beta$ |
| lnord ($\bullet$; $\mu$, $\sigma$) | lognormal pdf with parameters $\mu$ and $\sigma$ |
| gamd ($\bullet$; $\alpha$, $\beta$) | gamma pdf with shape parameter $\alpha$ and scale parameter $\beta$ |
| LaneProbFalseRestart | probability of a false lane restart |
| LaneRestartLimit | time in minutes until a successful lane restart |
| BufferStartProportion | starting quantity in buffer as a proportion of buffer capacity |
| SimulationDuration | period of time in minutes over which availability of a process is evaluated |
| LaneRepairOnFly | lane repair-on-the-fly flag (0-no, 1-yes) |
| LaneRestartOnFly | lane restart-on-the-fly flag (0-no, 1-yes) |
| RunRemainLanes | run remaining lanes flag (0-no, 1-yes) |
| WeibullBaseSpeed | Weibull uptime distribution base speed (products per minute) |
| LaneSpeed | lane speed (products per minute) |
| LaneFastSpeed | fast lane speed (products per minute) |
| LaneNormalSpeed | normal lane speed (products per minute) |
| LaneSlowSpeed | slow lane speed (products per minute) (note that LaneSlowSpeed < LaneNormalSpeed < LaneFastSpeed) |
| BufferCapacity | the capacity of a given buffer |
| BufferEmpty | zero products in a given buffer |

-continued

| NOTATION | |
|---|---|
| BufferCapacityUp | capacity of the upstream buffer (for a given manufacturing subsystem) |
| BufferCapacityDown | capacity of the downstream buffer |
| HitBufferCapacity | the event in which a given buffer hits BufferCapacity |
| HitBufferEmpty | the event in which a given buffer hits BufferEmpty |
| BufferInTriggers | set of ordered buffer triggers for controlling the speed of the adjacent upstream (downstream) manufacturing subsystem (expressed as a proportion of BufferCapacity) |
| BufferOutTriggers | |
| InSlow, InFast | buffer trigger for slowing down (speeding up) the adjacent upstream manufacturing subsystem |
| InSlowNormal, InFastNormal | buffer trigger for returning an adjacent upstream manufacturing subsystem to normal speed that had been previously slowed down (speeded up) |
| OutSlow, OutFast | buffer trigger for slowing down (speeding up) the adjacent downstream manufacturing subsystem |
| OutSlowNormal, OutFastNormal | buffer trigger for returning an adjacent downstream manufacturing subsystem to normal speed that had been previously slowed down (speeded up) |
| BufferInRestart | quantity in the buffer at which the adjacent upstream manufacturing subsystem is allowed to restart following a forced stoppage due to a HitBufferCapacity event |
| BufferOutRestart | quantity in the buffer at which the adjacent downstream manufacturing subsystem is allowed to restart following a forced stoppage due a HitBufferEmpty event |

Figure 3:
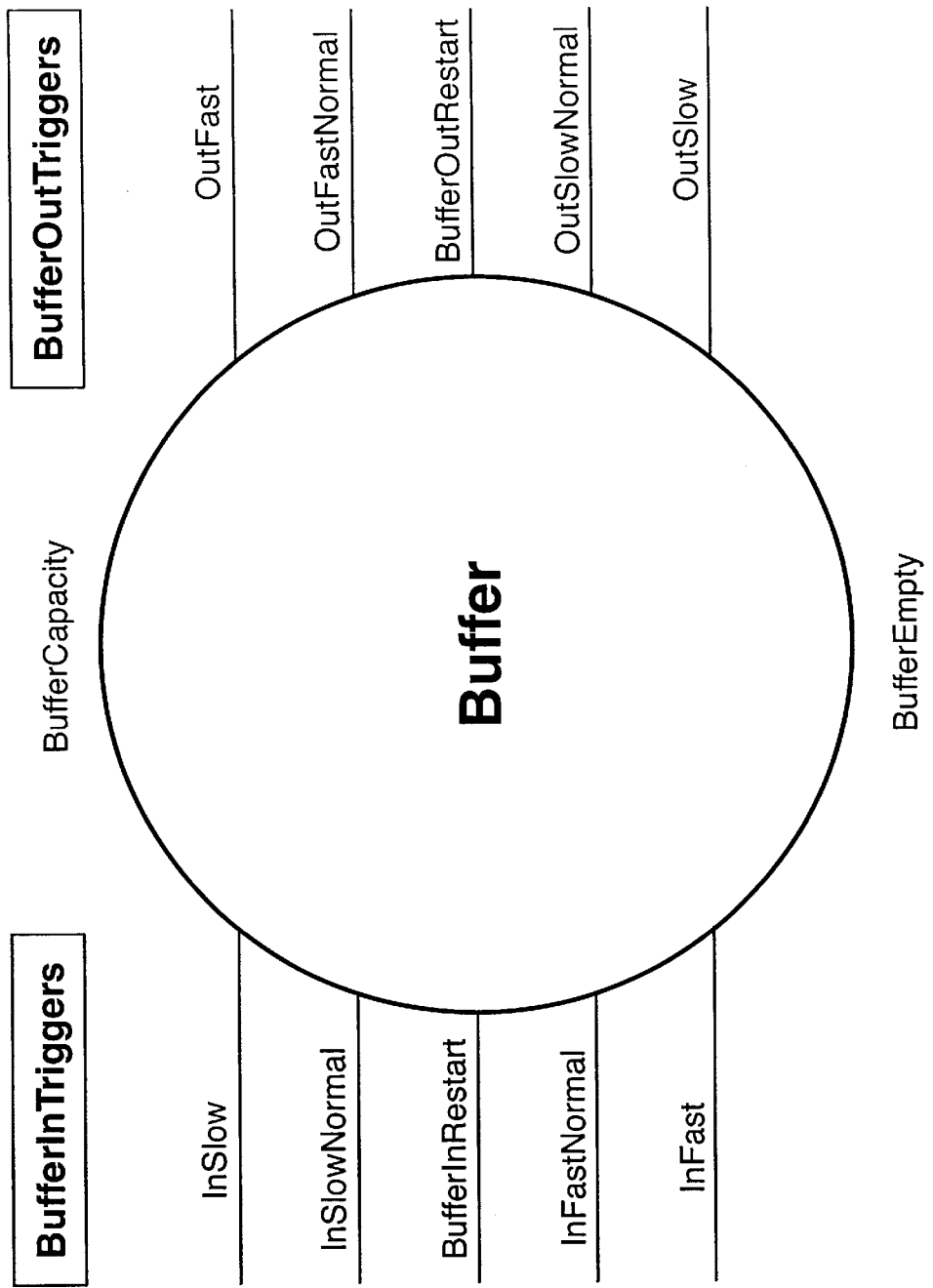
FIG. 3 graphically depicts input and output triggers for buffer operation in the exemplary system shown in FIG. 1.

FIG. 3 illustrates the relationships between the ordered buffer triggers; namely, InFast<InFastNormal<InSlowNormal<InSlow and OutSlow<OutSlowNormal<OutFastNormal<OutFast.

Weibull, lognormal, and gamma pdf's are conventional and well-known statistical functions. These pdf's have been selected to best represent experimental data from exemplary BIPs in the field of consumer products and are not to be considered as limiting or to represent BIPs in other fields. Statistical data is obtained from similar or analogous systems to select appropriate pdfs for use in applications of the present invention.

EXEMPLARY OPERATING RULES/ASSUMPTIONS

1. All lanes in a given manufacturing subsystem have the same characteristics, such as startup time, probability of a false restart, maximum lane speed, uptime and downtime distributions.

2. All lanes in a given subsystem operate at the same speed, and there are only three possible speeds: slow, normal and fast.

3. The slow, normal, fast lane speeds assume that all lanes in the subsystem are operating. Lanes are speeded up (but without exceeding the maximum lane speed) to compensate for non-operating lanes.

4. Operating a lane at a slow (fast) speed linearly increases (decreases) the Weibull expected lane uptime.

5. Once a lane that has failed is brought up, the speeds for all lanes are adjusted based on buffer triggers/capacities.

6. The speed of operating lanes is adjusted according to the following rules: lanes in manufacturing subsystem 1
   slow if BufferCapacityDown$\geq$InSlow
   fast if BufferCapacityDown$\leq$InFast
   normal otherwise
lanes in manufacturing subsystem m
   slow if BufferCapacityUp$\leq$OutSlow
   fast if BufferCapacityUp$\geq$OutFast
lanes in other manufacturing subsystems
   slow if BufferCapacityUp$\leq$OutSlow and BufferCapacityDown$\geq$InSlow
   normal if BufferCapacityUp$\leq$OutSlow and BufferCapacityDown$\leq$InFast
   slow if BufferCapacityUp$\leq$OutSlow and BufferCapacityDown otherwise
   normal if BufferCapacityUp$\geq$OutFast and BufferCapacityDown$\geq$InSlow
   fast if BufferCapacityUp$\geq$OutFast and BufferCapacityDown$\leq$InFast
   fast if BufferCapacityUp$\geq$OutFast and BufferCapacityDown otherwise
   slow if BufferCapacityUp otherwise and BufferCapacityDown>InSlow
   fast if BufferCapacityUp otherwise and BufferCapacityDown$\leq$InFast
   normal if BufferCapacityUp otherwise and BufferCapacityDown otherwise 7. The overall production rate capacity constraint is imposed only on the final manufacturing subsystem.

8. If a lane fails, there is no speedup of the remaining lanes unless the decision is to keep running the remaining lanes.

9. There is no speedup of a given lane while this lane is being repaired or restarted (speedup occurs only after the lane has successfully restarted).

10. Buffers cannot fail and therefore buffers do not have to be repaired.

11. There is instantaneous transport time through buffers.

12. There are instantaneous speed changes of operating lanes.

13. The overall system production rate cannot exceed ProductionLimit.

14. If a buffer hits BufferCapacity, all the lanes are stopped in the adjacent upstream manufacturing subsystem (a capacity outage).

15. If a buffer hits empty, all the lanes are stopped in the adjacent downstream manufacturing subsystem (a starved outage).

16. If a lane is successfully restarted without a repair preceding it, then the remaining lifetime is used if it is good-as-old, a new lifetime is used if it is good-as-new, and this lifetime is suitably adjusted for the current speed after applying the rules in Assumption 6.

17. To initialize the simulation, the capacities of the buffers are set to one-half of their respective capacities; i.e., BufferStartProportion 0.5.

18. Once repair begins on multiple failed lanes in a manufacturing subsystem, the lanes are simultaneously repaired; thus, the total repair time is the maximum of the individual lane repair times.

19. Lane failure times within a given subsystem are statistically independent (s-independent.)
Lane repair times within a given subsystem are s-independent.

Figure 1:
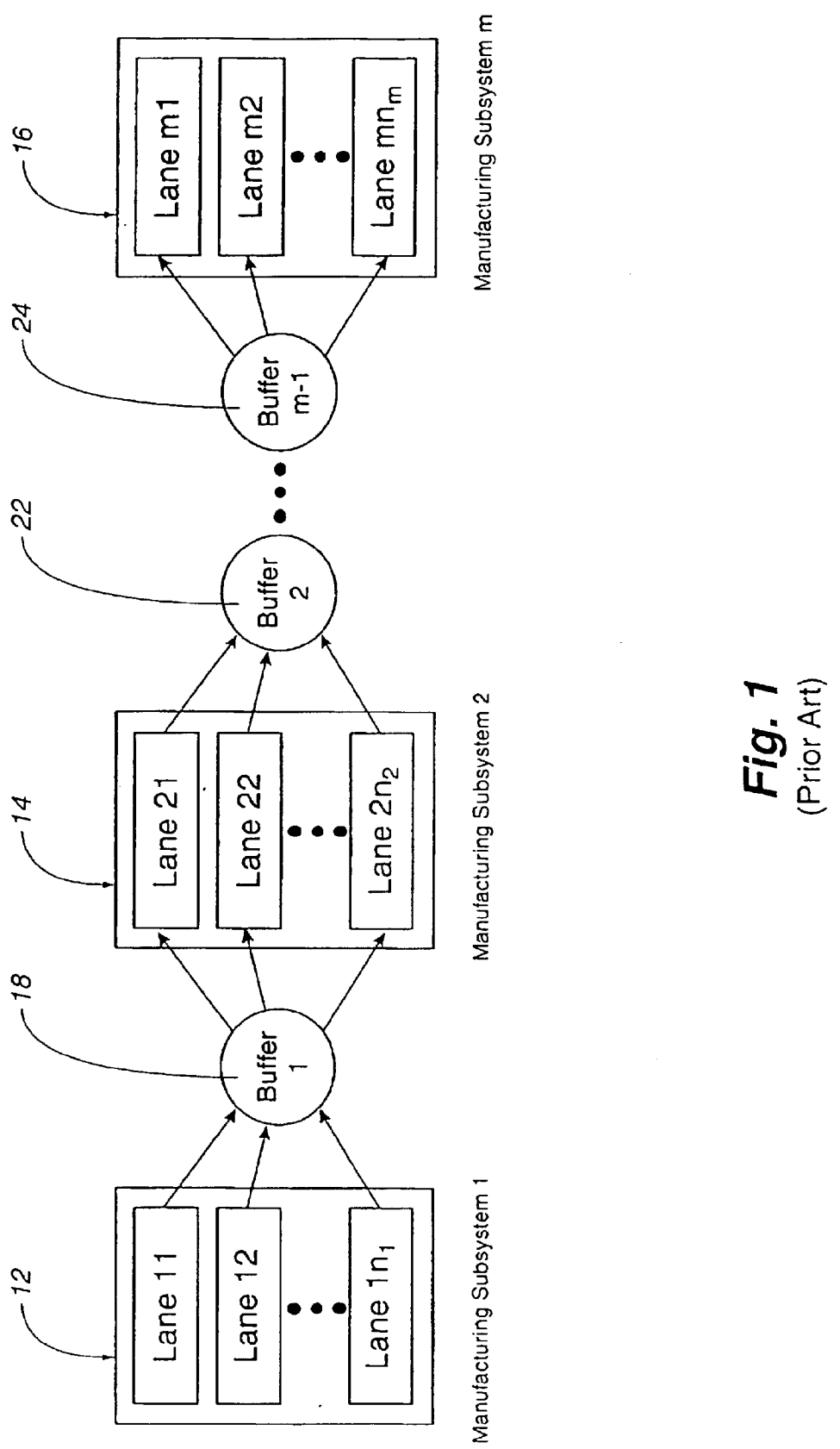
FIG. 1 schematically depicts a buffered industrial manufacturing process to exemplify an application of the present invention.
Figure 4:
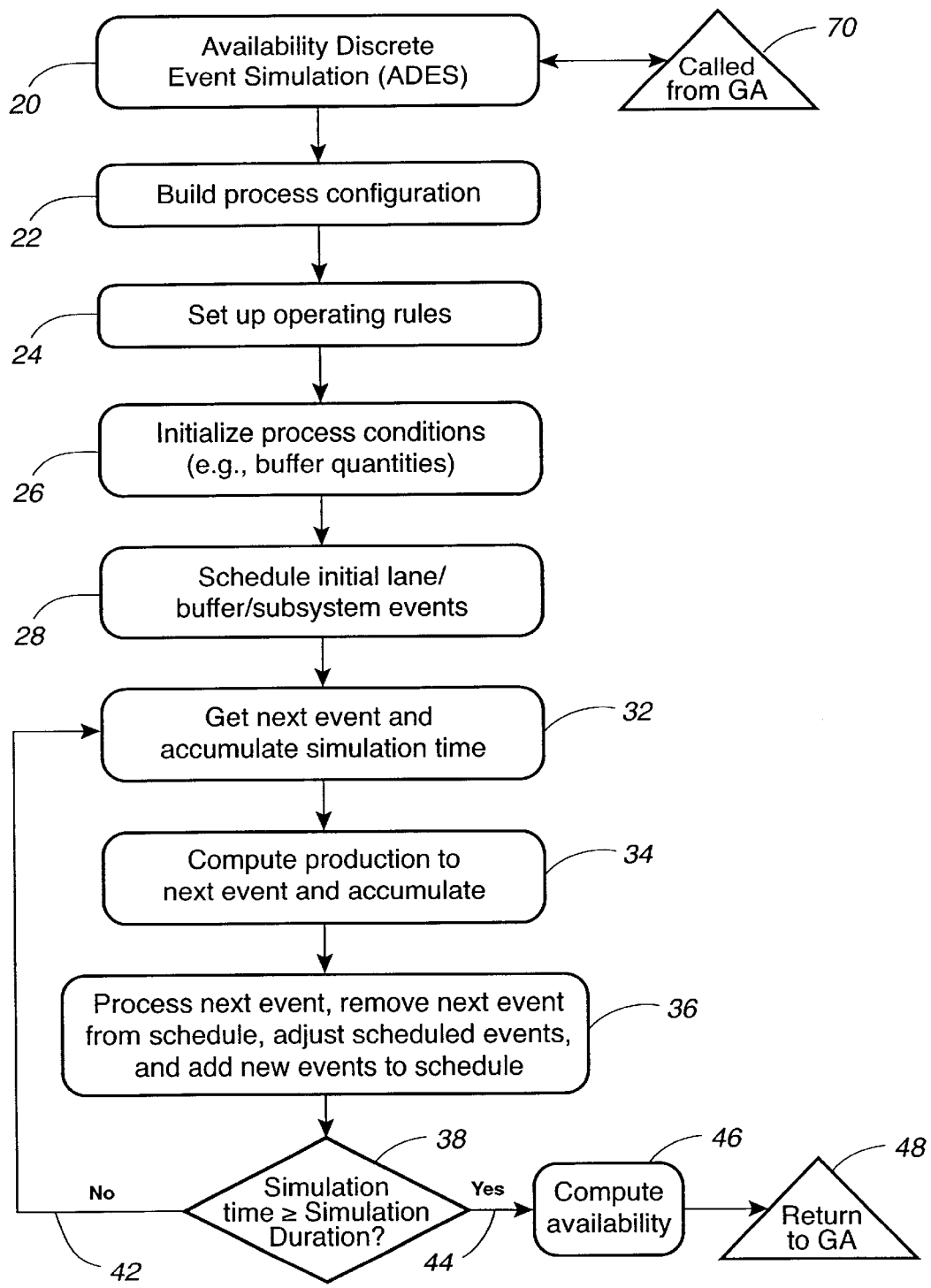
FIG. 4 is a process flow diagram for the availability discrete-event simulation (ADES) shown in FIG. 2.

Under the above operating rules/assumptions, the problem is to determine the availability of the BIP in FIG. 1 using the process for Availability Discrete Event Simulation 20, more particularly shown in FIG. 4. Because of the complexity of the BIP, the usual definition of time-dependent availability is difficult to apply. In accordance with the present invention, "availability" is defined here as the ratio of the expected number of products produced in a given period of time to the total number of products that would have been produced had the BIP not failed during this period. This new definition is the product-based availability. An estimate of this quantity is simply the ratio of the actual number of products produced in a given period of time to the total number of products that would have been produced had the BIP not failed during this period.

The ADES process 20 shown in FIG. 4 begins with step 22 where a first process configuration is set by assigning values for the parameters defined above. These parameters may comprise an initial set or may be derived from GA 50 and input as step 70. Likewise, operating rules are established at step 24, which may be the exemplary rules set out above. Finally, step 26 establishes the initial process conditions, which may be left from a previous iteration.

The ADES process then schedules initial lane/buffer/subsystem events as step 28. Consider three classes of events: lane events, manufacturing subsystem events, and buffer events. The four lane events considered are lane failure, lane repair, unsuccessful lane restart, and successful lane restart. Once a lane had been repaired, it is assumed that it unsuccessfully restarts (that is, the failure cause has not been properly diagnosed and repaired) with given probability LaneProbFalseRestart. It is further assumed that the attempt to restart a lane requires a total of LaneRestartLimit minutes in addition to any repair time.

The three manufacturing subsystem events considered here are subsystem repair, unsuccessful subsystem restart and successful subsystem restart. If a manufacturing subsystem has n lanes which restart s-independently of each other, then the probability of a successful restart of the entire subsystem is simply (1—LaneProbFalseRestart)n. Note that, even for relatively small values of LaneProbFalseRestart, the rapid decrease of this probability as a function of n prevents a subsystem from having too many lanes.

A buffer event occurs when the quantity in a given buffer hits any one of that buffer's corresponding capacity, trigger, or restart limits. The twelve buffer events involve the twelve triggers, restart limits, and capacities, as illustrated in FIG. 3.

A process for the discrete-event simulation of BIP availability based on these events is shown in FIG. 4, and at steps 32, 34, 36, 38, and 46, more particularly described in the Appendix. To estimate product-based availability, the total number of products actually produced during a sufficiently long time period (such as one or two years) simulated at step 38 are simply observed and accumulated. Such a simulated time period ensures a reasonably stable estimate of availability. While the total number of products actually produced represents the numerator of the availability ratio, the denominator is simply the length of the time period multiplied by the ProductionLimit.

Aspects of the discrete-event simulation include: (1) the modification of lane failure times to account for speed changes, (2) the decision analysis, (3) good-as-new versus good-as-old lane performance, and (4) the repair and restart of lanes on-the-fly.

Three lane speeds are considered in the simulation for each manufacturing subsystem: LaneFastSpeed, LaneSlowSpeed and LaneNormalSpeed. The lane failure times $t_{ij}$ (uptimes) are assumed to follow a weibd($\bullet$; $\alpha$, $\beta$) distribution with mean $\alpha\Gamma(1+1/\beta)$ (conventional gamma function). In practice, data used to determine the maximum likelihood estimates (MLES) of $\alpha$ and $\beta$ that will be used in the simulation are assumed relative to WeibullBaseSpeed, a known nominal lane operating speed. Lanes that operate faster than this base speed are often observed to have a shorter mean uptime, while lanes that operate slower than the base speed are observed to have longer mean uptime. This observation in the simulation is statistically represented in a rather simple way. The value of the scale parameter $\alpha$ is adjusted inversely proportional to the new speed relative to the base speed. That is, $\alpha$ is redefined (rescaled) as $\alpha$(WeibullBaseSpeed/LaneSpeed), where LaneSpeed denotes the current value of lane speed (i.e., LaneFastSpeed, LaneSlowSpeed or LaneNormalSpeed). Notice that the mean uptime is thus rescaled by this same ratio.

In the process, there is one decision that is dynamically made in executing the simulation in step 34 when computing the production during an event cycle. Upon lane failure in a given manufacturing subsystem, an important question becomes: should the remaining operating lanes be stopped, the failed lanes repaired, and then the subsystem restarted, or should the remaining lanes continue to operate without stopping until the next lane failure occurs?

To make this decision, consider the following stochastic, feed-forward controller. Suppose that "Decision A" is defined as the decision to continue to operate and "Decision B" as the decision to stop, repair and restart the entire subsystem. The expected production rate (products per unit time) per expected cycle for each decision are calculated, which are denoted by E(A) and E(B), respectively, and these expectations are compared. Decision A is chosen if E(A) $\geq$ E(B) and Decision B otherwise.

Figure 6:
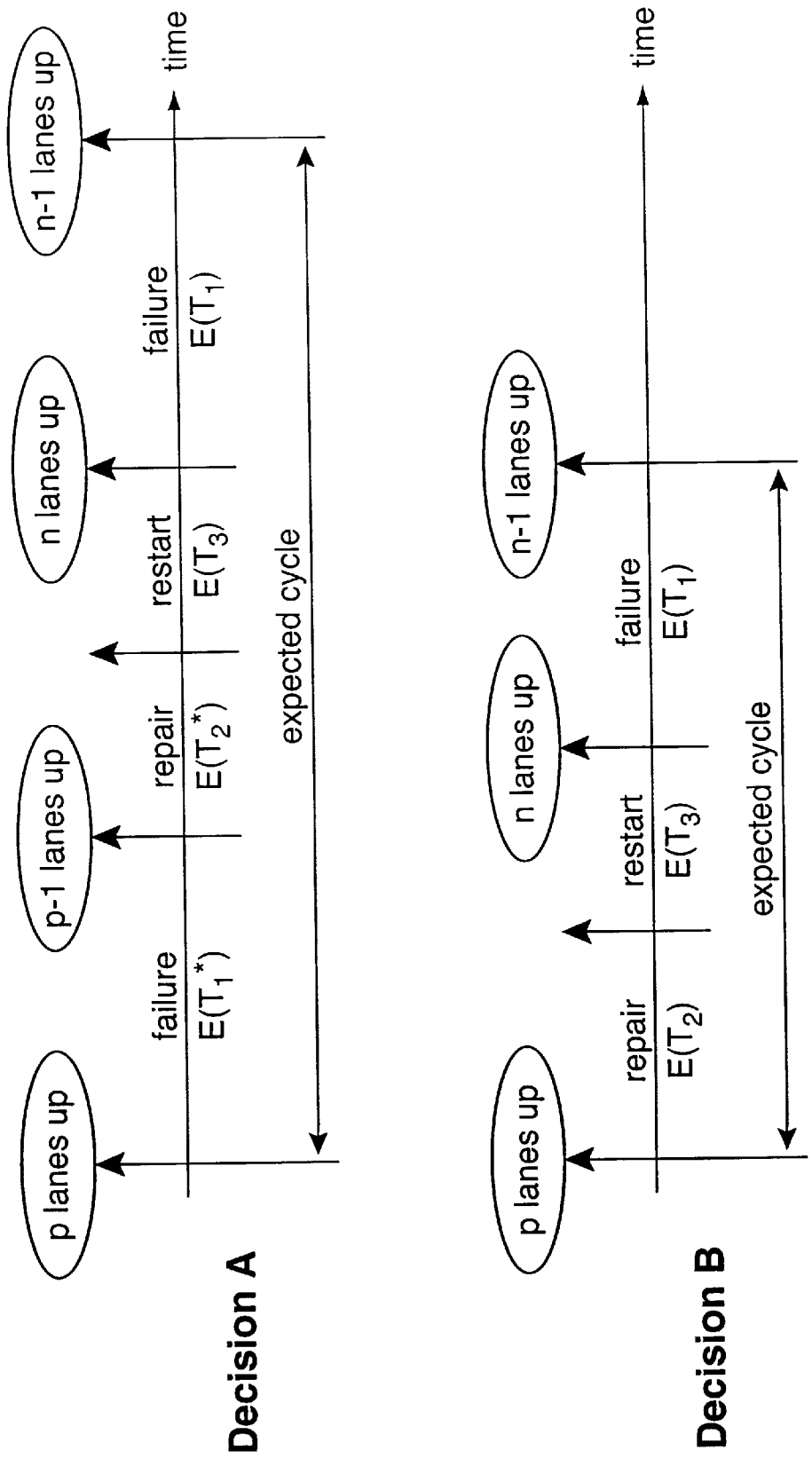
FIG. 6 schematically depicts event cycles for use in the process described in the Appendix.

Suppose there are n lanes in a given subsystem of interest, of which there are only p operating lanes (thus n–p failed lanes) at the time the decision is to be made. Further, define an "expected cycle" as the expected length of time from the (n–p)th lane failure until the time at which n–1 lanes are once again operating. FIG. 6 illustrates the various events and corresponding expected time periods (E($T_n$)) that occur during an expected cycle for both decisions.

First consider Decision A. Note that E($T_1^*$) represents the difference in the mean of the (n–p+1)$^{st}$ and the (n–p)$^{th}$ order statistics of a sample of size n from a weibd[$\bullet$; $\alpha$(LaneNormalSpeed/LaneFastSpeed), $\beta$] distribution. Also note that this Weibull distribution shows the decrease in the mean uptime as a result of increasing the operating speed of the remaining lanes from LaneNormalSpeed to LaneFastSpeed. From Johnson & Kotz [6], it is found that $$E(T_1^*) = \frac{n!\alpha^*}{(n-p)!(p-1)!}\Gamma\left(1+\frac{1}{\beta}\right)\sum_{j=o}^{n-p}\binom{n-p}{j}(-1)^j(p+j)^{-\left(1+\frac{1}{\beta}\right)} - \quad \text{Eq. 1}$$

$$\frac{n!\alpha^*}{(n-p)!p!}\Gamma\left(1+\frac{1}{\beta}\right)\sum_{j=o}^{n-p-1}\binom{n-p}{j}(-1)^j(p+j+1)^{-\left(1+\frac{1}{\beta}\right)},$$

where $\alpha^*$=$\alpha$(LaneNormalSpeed/LaneFastSpeed).

Assume that repairs (downtimes) follow a Inord($\bullet$; $\mu$, $\sigma$) distribution (a log normal distribution). Now, under assumption (18), above, E($T_2^*$) is the mean of the maximum of (n–p+1) Inord($\bullet$; $\mu$, $\sigma$) r.v. (random variable). To calculate this quantity, the values of v and w are obtained from Table 1 corresponding to the value of n–p+1.

TABLE 1

| | Values of v and w | | | | |
|---|---|---|---|---|---|
| n − p + 1 | v | w | n − p + 1 | v | w |
| 1 | 1.64872 | 7.38906 | 11 | 5.86156 | 53.4520 |
| 2 | 2.50688 | 13.6158 | 12 | 6.08710 | 57.0146 |
| 3 | 3.13439 | 19.1916 | 13 | 6.29971 | 60.4749 |
| 4 | 3.64058 | 24.3187 | 14 | 6.50101 | 63.8420 |
| 5 | 4.06986 | 29.1069 | 15 | 6.69229 | 67.1237 |
| 6 | 4.44526 | 33.6254 | 16 | 6.87465 | 70.3268 |
| 7 | 4.78049 | 37.9214 | 17 | 7.04901 | 73.4572 |
| 8 | 5.08441 | 42.0288 | 18 | 7.21613 | 76.5200 |
| 9 | 5.36313 | 45.9737 | 19 | 7.37667 | 79.5197 |
| 10 | 5.62108 | 49.7760 | 20 | 7.53121 | 82.4603 |

The values of v and w in Table 1 are the first two moments of the maximum of (n−p+1) Inord(•; 0, 1) r.v., which are obtained by numerical integration. Using the appropriate values of v and w from Table 1, the second-order Taylor series approximation given by $$E(T_2^*) \approx e^{\mu} v^{\sigma} + 0.5\sigma(\sigma-1)v^{\sigma-2}e^{\mu}(w-v^2) \qquad \text{Eq. 2}$$

is used to calculate an approximation to $E(T_2^*)$ for a general Inord(•; $\mu$, $\sigma$) r.v.

Now consider $E(T_3)$ in FIG. 6:

$$E(T_3) = \text{LaneRestartLimit} + \{(\text{LaneRestartLimit}/2) + e^{\mu + \sigma^2/2}\} \times [(1 - \text{LaneProbFalseRestart})^{-n} - 1]. \qquad \text{Eq. 3}$$

In this expression, the term in square brackets represents the expected number of false (unsuccessful) subsystem restart attempts prior to the first successful restart. Each of these unsuccessful restart attempts requires an average expected total time given by the term in curly brackets. Finally, the first term on the r.h.s. of Equation (3) is the time spent restarting the subsystem on the final successful attempt.

The term $E(T_1)$ in FIG. 6 is simply the expected value of the first order statistic from a sample of size n from a weibd(•, $\alpha$, $\beta$) distribution. We find that $$E(T_1) = n^{-1/\beta}\alpha\Gamma\left(1 + \frac{1}{\beta}\right). \qquad \text{Eq. 4}$$

Now consider Decision B in FIG. 6. The value of $E(T_2)$ is the expectation of the maximum on (n−p) Inord(•; $\mu$, $\sigma$) r.v. To approximate $E(T_2)$, Table 1 is entered at row value (n−p) instead of row (n−p+1) as in calculating $E(T_2^*)$. After obtaining v and w, the second-order Taylor series approximation given by Equation (2) is again used.

For Decision A the first-order approximation to the expected production rate per expected cycle becomes $$E(A) \approx \frac{E(T_1^*) \times p \times LaneFastSpeed + E(T_1) \times n \times LaneNormalSpeed}{E(T_1^*) + E(T_2^*) + E(T_3) + E(T_1)} \qquad \text{Eq. 5}$$

and, for Decision B, the expected production rate per expected cycle becomes $$E(B) \approx \frac{E(T_1) \times n \times LaneNormalSpeed}{E(T_2) + E(T_3) + E(T_1)} \qquad \text{Eq. 6}$$

If $E(A) \geq E(B)$, choose Decision A; otherwise, choose Decision B.

Lane failure times are assumed to be either good-as-new or good-as-old independently for each subsystem. For example, suppose a subsystem experiences a lane failure. Upon lane failure, further suppose that the decision is made to stop the subsystem, repair the failed lane, and restart the subsystem. Although a new random failure time is drawn for the repaired lane, the remaining lanes may or may not require new random draws. In some applications the remaining lanes act as though they are as good-as-new (because of the stop), even though they have not failed. In such cases, new failure times would then simply be s-independently drawn for each of these lanes. In other cases, the remaining lanes exhibit good-as-old behavior, and the failure time of the failed lane would simply be subtracted from each of the original failure times. In this case, these subtracted times would be taken to be the residual failure times for use in the next event cycle.

For some subsystems, it may be possible to run the remaining lanes given that one or more lanes have failed. It may also be possible to repair or restart failed lanes on-the-fly; that is, without the necessity to first stop the remaining operating lanes before either repairing or restarting the failed lanes. These represent three yes/no flags that can be set for each subsystem. The answers to the corresponding questions in the algorithm depend on how these flags are set (see Appendix). Note here that, although uptimes and downtimes are assumed to be s-independent within a coupled subsystem, the corresponding product-availabilities become dependent because of the use of common repair and restart rules.

Referring now to FIG. 4, when a present event cycle is completed in step 34, and the production during that event cycle is computed and accumulated, step 36 acts to process the next event cycle based on processed failure times from the Good As Old and Good As New lanes. Based on these times, the next event may be processed, the anticipated next event may be removed from the schedule, and scheduled events may be added to the schedule.

After each event cycle, the accumulated simulation time is compared with Simulation Duration in step 38. If additional simulation time is needed, loop 42 returns to step 32 to get a new event and process another event cycle. If Simulation Duration is satisfied 44, the availability of the BIP having the Process configuration input at step 70 is computed at step 46 and returned 48 for use by GA 50 (FIG. 2).

Genetic Algorithm

Figure 5:
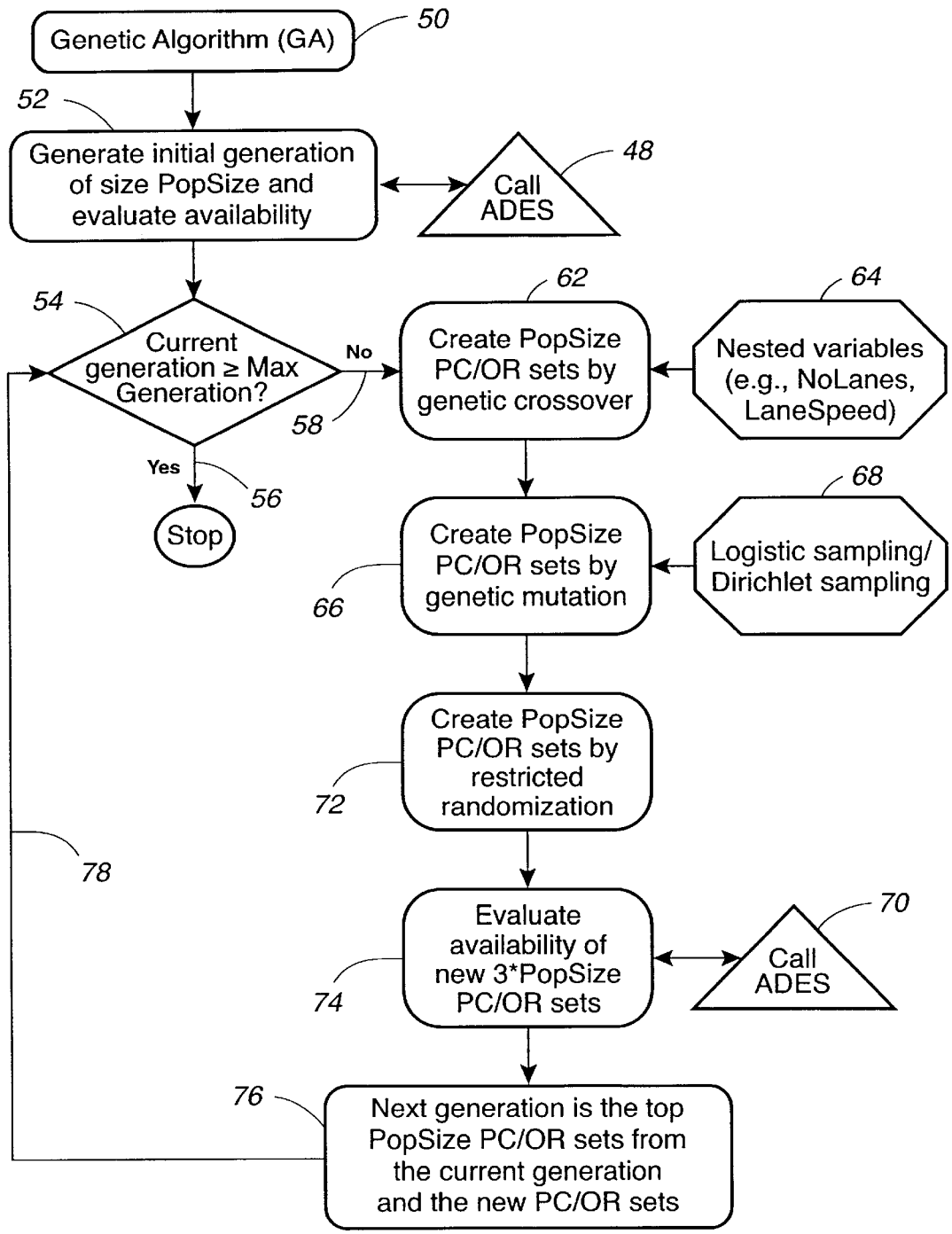
FIG. 5 is a process flow diagram for the genetic algorithm (GA) shown in FIG. 2.

A GA is used to establish populations of individuals (BIPS) that undergo a fitness evaluation i.e., ADES shown in FIG. 4. The GA of the present process is shown in FIG. 5 and has characteristics ("chromosomes") defined by the notations below.

| Process Configuration Definitions/Notations | |
|---|---|
| MinNoLanes | minimum number of lanes in a given subsystem |
| MaxNoLanes | maximum number of lanes in a given subsystem |
| UncoupledLanes | flag denoting whether the lanes in a given subsystem are coupled or uncoupled [0-coupled, 1-uncoupled] (see below) |
| MinUncoupledLanes | must be 0 or 1 and less than or equal to MaxUncoupledLanes (see below) |
| MaxUncoupledLanes | must be 0 or 1 (see below) |
| MinLaneSpeed | minimum lane speed (must be less than MaxLaneSpeed) |

-continued

| Process Configuration Definitions/Notations | |
|---|---|
| MaxLaneSpeed | maximum lane speed |
| MinBufferCapacity | minimum buffer capacity |
| MaxBufferCapacity | maximum buffer capacity (must be greater than or equal to MinBufferCapacity) |
| PopSize | current population size (also the number of crossovers, mutations and random individuals considered per generation) |
| MutationRate | parameter that controls the decay rate of the probability of a mutation (see below) |
| MutationSigma | parameter that controls the variation of mutation of real and integer variables (see below) |
| MaxGeneration | maximum number of GA generations |
| LaneRules | categorical variable used to denote feasible combinations of lane operating rules for coupled lanes; namely, (LaneRepairOnFly,LaneRestartOnFly, RunRemainLanes) [the following four combinations are allowed: 1 = (0,0,0); 2 = (1,0,1); 3 = (0,0,1); and 4 = (1,1,1)] (see below) |

Goldberg (1989) [5] and Michalewicz (1992) [12] provide introductory information on GAs. We have found that GAs are particularly attractive for identifying BIP designs having high product-availability because the designs we consider involve categorical variables as well as variables that are both continuous and discrete. In addition, some of the continuous variables are ordered variables. The fitness (function) in accordance with the present invention is the product-based availability of a BIP as determined from the discrete-event simulation described above.

Although the traditional GA considers binary variables, more recent versions of GA use natural (base 10) variables. Natural variables are used in the present invention because of their convenience, but binary variables could be used.

For each subsystem consider two extreme cases involving lane coupling: completely coupled and uncoupled lanes (UncoupledLanes=0 or 1). UncoupledLanes=1 represents the case in which all lanes in a given subsystem are completely uncoupled (i.e., independent) from each other. That is, the subsystem consists of n completely independent single-lane "machines" each performing the same function. These machines may in fact be in entirely different locations within a given facility or may even be in completely different facilities. The important characteristic that distinguishes such a completely uncoupled arrangement is that each lane can be operated, repaired and restarted completely independently of any other lane. In this case, LaneRules= 1=(0, 0, 0).

If UncoupledLanes=0, then the lanes are considered to be coupled and the categorical variable LaneRules may assume any of its possible values 1–4. In other words, in this case values are determined for the feasible combinations of parameters (which are flags), LaneRepairOnFly, LaneRestartOnFly, and RunRemainLanes that contribute to high availability.

In application of GA to the present invention, eight (8) variables associated with the design and operation of each manufacturing subsystem in the BIP are considered: the discrete variable NoLanes; the three feasible combinations of the binary flags LaneRepairOnFly, LaneRestartOnFly, and RunRemainLanes (as expressed using the single categorical variable LaneRules); the UncoupledLanes binary flag variable; and the three continuous (but ordered) LaneSpeed variables (LaneSlowSpeed, LaneNormalSpeed and LaneFastSpeed).

Likewise, eleven (11) variables associated with the buffer design and operation of each buffer in the BIP are considered: the continuous variable BufferCapacity, four continuous (but ordered) BufferInTriggers (InSlow, InSlowNormal, InFastNormal and InFast); the two continuous variables BufferInRestart and BufferOutRestart; and the four continuous (but ordered) BufferOutTriggers (OutFast, OutFastNormal, OutSlowNormal and OutSlow).

The following boundary conditions (or limits) are imposed during the GA search: Min NoLanes ≦ NoLanes ≦ MaxNoLanes, Min UncoupledLanes ≦ UncoupledLanes ≦ MaxUncoupledLanes. Note that any subsystem can be forced to contain coupled or uncoupled lanes by setting MinUncoupledLanes= MaxUncoupledLanes=0 or 1, respectively. Also, MinLaneSpeed ≦ LaneSlowSpeed<LaneNormalSpeed <LaneFastSpeed ≦ MaxLaneSpeed. Finally, any given buffer requires that MinBufferCapacity ≦ BufferCapacity ≦ MaxBufferCapacity.

Consider the details for generating the initial population of PopSize individuals. Non-ordered continuous and discrete variables are selected according to a uniform distribution. The UncoupledLanes flag variable is then selected at random: if UncoupledLanes=1, then LaneRules is set to 1=(0,0,0); otherwise, LaneRules is drawn randomly from the set of integers 1–4.

LaneSlowSpeed is then drawn from uniform (MinLaneSpeed, MaxLaneSpeed), LaneNormalSpeed is drawn from uniform(LaneSlowSpeed, MaxLaneSpeed), LaneFastSpeed is drawn from uniform(LaneNormalSpeed, MaxLaneSpeed).

Now consider the initial ordered BufferInTriggers. InFast is drawn from uniform(0, 0.25), InFastNormal is drawn from uniform(0.35, 0.65), InSlowNormal is drawn from uniform(InSlowNormal, 0.65), and finally InSlow is drawn from uniform(0.75, 1). The initial ordered BufferOutTriggers are uniformly drawn in a similar way. The specific ranges herein are exemplary based on statistical data from actual BIP of interest and should be adjusted from statistical data on other BIPs.

FIG. 5 more particularly depicts an exemplary GA process for application to BIP design. An initial generation of PopSize individuals is generated at step 52, with each individual having "chromosomes" represented by selected variables for the BIP subsystems and buffers. An exemplary initial PopSize is ten (10). The fitness (availability) of each of these individuals is then evaluated by calling ADES at step 48 and executing the discrete-event simulation described above (see FIG. 4 and related discussion) for a SimulationDuration time period. These PopSize individuals are then ranked according to their fitness value. The population generation number is compared with a MaxGeneration number at step 54. If MaxGeneration is reached 56, the process is stopped and a BIP system design is output. If not 58, a new generation is created.

Genetic crossover (mixing of parent genes) is now performed at step 62 either by individual variable or by groups of variables determined uniformly for input at step 64. More individuals (genetic offspring or progeny) are identified for inclusion in the PopSize population. The parents are chosen from the current population with probability inversely proportional to fitness ranking. LaneRules is one group of variables, while (UncoupledLanes, LaneRules) is another group of variables. Also, (LaneSpeeds, NoLanes) is treated as a group of variables that remain together in the crossover operation. The fitness of each of these PopSize progeny is then calculated by ADES.

Next, PopSize more individuals are identified for inclusion in the population by so-called genetic mutation at step 66. Each variable or group of variables is mutated with probability exp(−MutationRate×generation). Note that this represents an exponential decay in the probability that a mutation occurs as a function of generation. The group (UncoupledLanes, LaneRules) is mutated as a group of variables. Provided that mutation occurs, if UncoupledLanes=1, then LaneRules equals 1=(0, 0, 0); otherwise, LaneRules is drawn randomly.

Other variables are drawn from step 68 with expectation taken to be the current value and variance decreasing in successive generations. For continuous and discrete variables, a logit transformation is used as follows: first compute $$z = \frac{c-l}{h-l}$$

where c, l, h are the current, minimum and maximum values of the variable. Then calculate d=log(z/(1−z))+(uniform(0, 1)−0.5)×MutationSigma×exp(−MutationRate×generation). Finally compute u=exp(d)/(1+exp(d)) which is converted to a value between l and h. This logit transformation has the properties that the expected value is the current value c and the standard deviation decreases with generation.

For continuous ordered variables, a technique known as Dirichlet sampling is used. For example, consider the four ordered BufferInTriggers: InFast, InFastNormal, InSlowNormal and InSlow. For convenience, let $p_i$, i=1, . . . , 4, denote these four ordered triggers; thus, $0<p_1<p_2<p_3<p_4<1$. The following steps are performed:

Calculate $o_i=p_i-p_{i-1}$, i=1, . . . , 5, where $p_0=0$ and $p_5=1$

Calculate $o_i=o_i(10+100(1-\exp(-\text{MutationRate} \times \text{generation})))$ Draw $y_i$ from a gamd(•; 1, $o_i$) distribution, i=1, . . . 5

Calculate $$y_i^* = y_i \Big/ \sum_{j=1}^{5} y_i, i = 1, \ldots, 4$$

(which have a Dirichlet distribution)

Calculate $$z_i = \sum_{j=1}^{i} y_j^*, i = 1, \ldots, 4.$$

Figure 7:
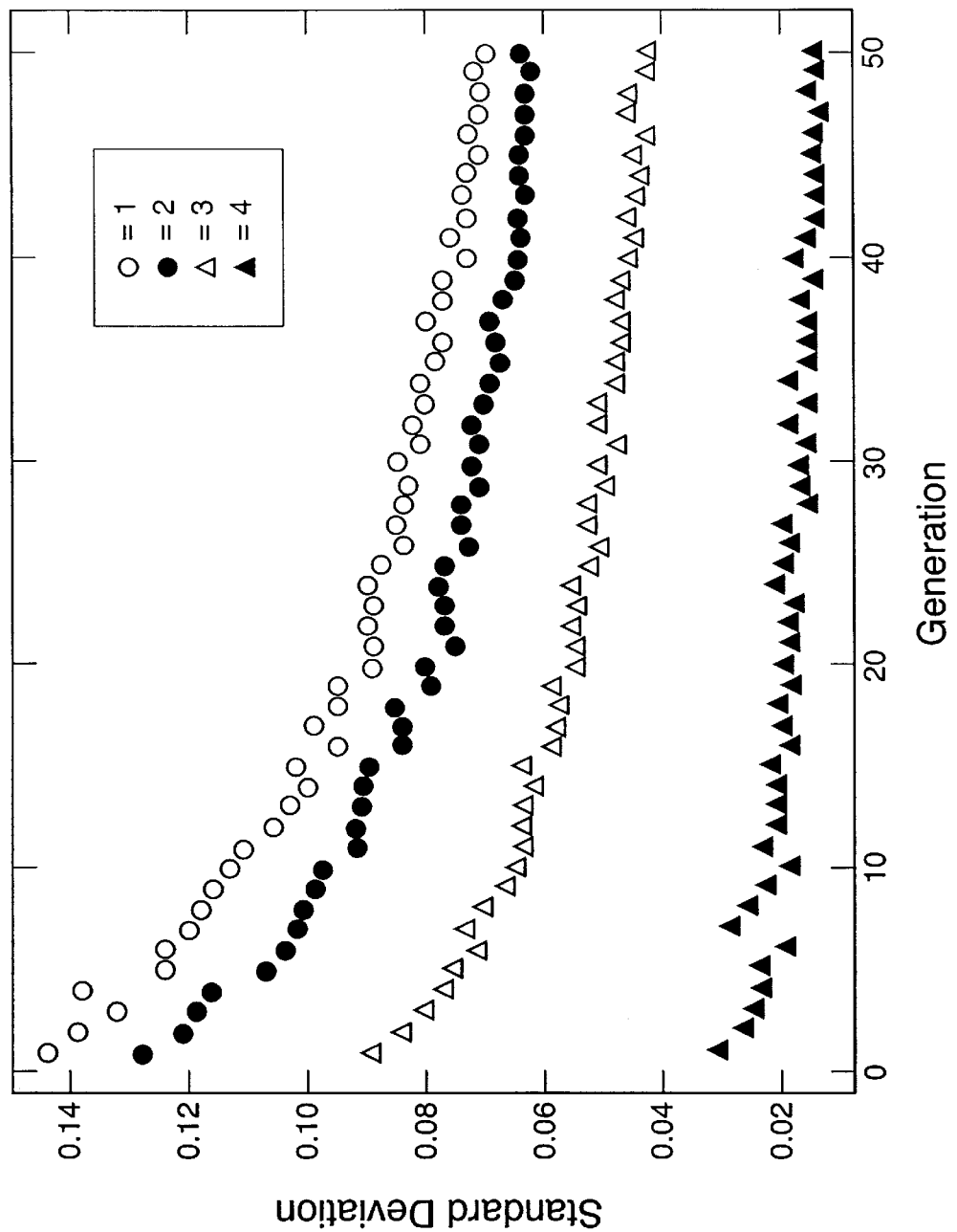
FIG. 7 graphically depicts standard deviation values for a Dirichlet sampling scheme used in the exemplary GA process shown in FIG. 5.

This Dirichlet sampling scheme has the following properties: (1) the expected value of $z_i$ is the current value $p_i$, and (2) the standard deviation of $z_i$ decreases in successive generations. FIG. 7 presents the sample standard deviations of the $z_i$'s based on 10,000 draws for $p_1$=0.5, $p_2$=0.75, $p_3$=0.9, $p_4$=0.99 and with MutationRate=0.01. The figure clearly shows how the standard deviations decrease. As before, the fitness of each of these PopSize mutated individuals is then computed by calling ADES.

Finally, additional PopSize individuals are added at step 72 to the population at each successive generation by random selection as described for the initial population at step 52.

The above GA procedure yields a total of 4×PopSize individuals in the population. The availabilities of the new 3×PopSize individuals are determined by ADES at step 70 and evaluated at step 74 so that the BIP configurations can be ranked to form a new generation of PopSize individuals (Process Configuration/Operating Rule (PC/OR) sets) for returning to step 54 to form the final PC/OR sets at step 56 or for use in creating additional PopSize sets for evaluation. The PopSize individuals having the best fitness (highest product-availability) become the initial population for use at the next generation. The process described above is repeated for MaxGeneration generations, and the identity of the most-fit individual at each generation is identified and retained.

EXAMPLE

Consider the design and operation of a BIP containing four manufacturing subsystems and three buffers (m=4) that must be capable of producing at most 400 products per minute (ProductionLimit=400). Tables 2 and 3 contain the required subsystem-level input parameters for the system and there are a total of 65 parameters whose optimal values are sought. In Table 2, notice that the Weibull failure time distributions all have β<1; thus, all lanes tend to fail prematurely. The mean lane failure times are 91.7, 16.2, 9.6 and 21.5 minutes for each of the four subsystems, respectively. From Table 3, the corresponding lognormal mean lane repair times are 1.5, 1.0, 0.8 and 1.0 minutes.

TABLE 2

Manufacturing Subsystem Input Parameters

| | Manufacturing Subsystem | | | |
|---|---|---|---|---|
| Parameter | 1 | 2 | 3 | 4 |
| GoodAsOld | 0 | 1 | 1 | 0 |
| WeibullBaseSpeed | 100 | 100 | 100 | 100 |
| α | 29.5 | 8.1 | 6.1 | 9.1 |
| β | 0.41 | 0.50 | 0.58 | 0.46 |
| μ | 0.33 | −0.13 | −0.26 | −0.10 |
| σ | 0.42 | 0.44 | 0.39 | 0.41 |
| LaneProbFalseRestart | 0.25 | 0.25 | 0.25 | 0.25 |
| LaneRestartLimit | 0.10 | 0.15 | 0.15 | 0.10 |
| MinNoLanes | 1 | 1 | 1 | 1 |
| MaxNoLanes | 4 | 4 | 4 | 4 |
| MinLaneSpeed | 25 | 25 | 25 | 25 |
| MaxLaneSpeed | 150 | 150 | 150 | 150 |
| MinUncoupledLanes | 0 | 0 | 0 | 0 |
| MaxUncoupledLanes | 1 | 1 | 1 | 1 |

TABLE 3

Buffer Input Parameters

| | Buffer | | |
|---|---|---|---|
| Parameter | 1 | 2 | 3 |
| BufferStartProportion | 0.5 | 0.5 | 0.5 |
| MinBufferCapacity | 400 | 400 | 400 |
| MaxBufferCapacity | 6750 | 6750 | 6750 |

A one-year simulated time period is to be used (SimulationDuration=525600). Other GA parameters for this example are PopSize=10, MutationRate=0.01, MutationSigma=1.0, and MaxGeneration=100.

Figure 8:
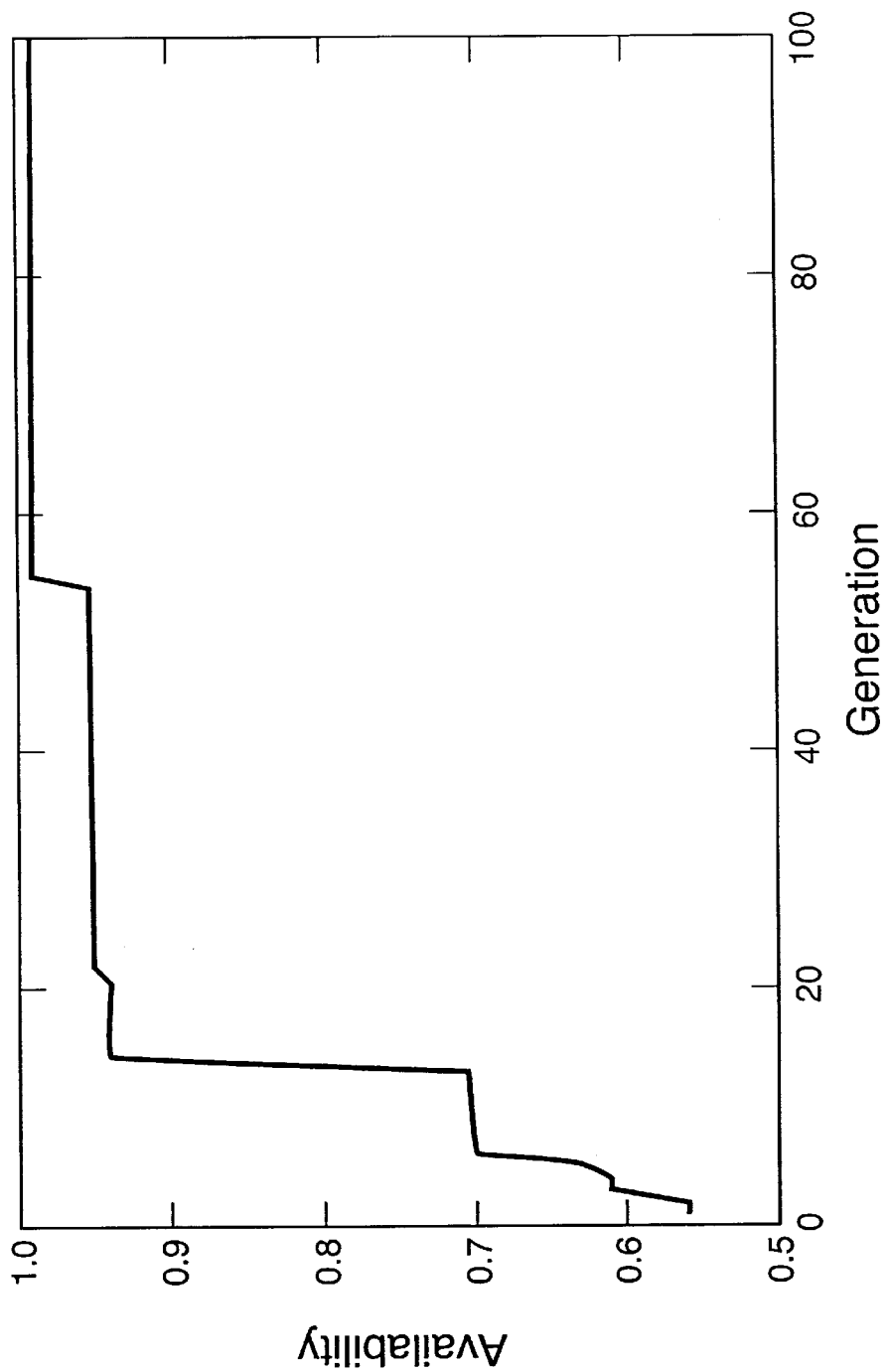
FIG. 8 graphically depicts the evolution of a product availability figure of merit to illustrate the efficacy of the present invention.

After 100 generations of the GA, the highest product-availability attained was 0.9905 with an estimated standard deviation of 0.0002. FIG. 8 shows the evolution of the availability associated with the solution having the highest availability for each of the 100 generations. Table 4 contains the eight (8) corresponding design and operating parameter values (the solution set) for each of the four manufacturing subsystems for the BIP having the greater availability. A configuration having NoLanes=4 (the upper limit) is the optimal choice for each subsystem. Note also that UncoupledLanes=1 is the preferred design choice because such a configuration is completely unconstrained with regard to repair and restart. Likewise, Table 5 contains the eleven (11) corresponding optimal design and operating parameter values for each buffer.

TABLE 4

Optimal Manufacturing Subsystem Parameters

| Parameter | Manufacturing Subsystem | | | |
|---|---|---|---|---|
| | 1 | 2 | 3 | 4 |
| NoLanes | 4 | 4 | 4 | 4 |
| LaneRepairOnFly | 0 | 0 | 0 | 0 |
| LaneRestartOnFly | 0 | 0 | 0 | 0 |
| RunRemainLanes | 0 | 0 | 0 | 0 |
| UncoupledLanes | 1 | 1 | 1 | 1 |
| LaneSlowSpeed | 84.76 | 146.09 | 123.28 | 93.47 |
| LaneNormalSpeed | 95.56 | 146.63 | 146.05 | 99.76 |
| LaneFastSpeed | 100.81 | 149.45 | 148.01 | 99.81 |

TABLE 5

Optimal Buffer Parameters

| Parameter | Buffer | | |
|---|---|---|---|
| | 1 | 2 | 3 |
| BufferCapacity | 3823.6 | 5564.6 | 6117.6 |
| InSlow | 0.97 | 0.76 | 0.91 |
| InSlowNormal | 0.59 | 0.65 | 0.43 |
| InFastNormal | 0.43 | 0.64 | 0.42 |
| InFast | 0.30 | 0.05 | 0.22 |
| BufferInRestart | 0.18 | 0.07 | 0.79 |
| BufferOutRestart | 0.16 | 0.84 | 0.54 |
| OutFast | 0.87 | 0.87 | 0.88 |
| OutFastNormal | 0.50 | 0.43 | 0.48 |
| OutSlowNormal | 0.46 | 0.39 | 0.46 |
| OutSlow | 0.04 | 0.01 | 0.06 |

Because of less redundancy and greater economy of scale, coupled subsystems are usually less expensive to build than fully uncoupled ones. In order to examine the effect of lane coupling on availability, suppose all subsystems are constrained to be coupled. This is done by simply replacing the last row in Table 2 with a row containing all zeros. In the example, the optimal availability after 100 generations was found to be 0.9166 with an estimated standard deviation of 0.0023. Thus, the penalty for the anticipated cost improvement is a 7.5% decrease in BIP product-availability.

The present invention is part of an ongoing effort to provide computer apparatus and processes to enhance the reliablity in design and operation of complex manufacturing systems. The following applications are incorporated herein by reference:

COMPUTER APPARATUSES AND PROCESS FOR ANALYZING A SYSTEM HAVING FALSE START EVENTS, Eric C. Berg et al., Provisional Application S.No. 60/202,010, filed May 4, 2000;

COMPUTER APPRATUSES AND PROCESSES FOR ANALYZING A SYSTEM HAVING CUMULATIVE AND COMPETING CAUSE FAILURE MODES, Donna M. Caporale et al., patent application Ser. No. 09/565,008, filed May 4, 2000.

The foregoing description of the invention has been presented for purposes of illustration and description and is not intended to be exhaustive or to limit the invention to the precise form disclosed, and obviously many modifications and variations are possible in light of the above teaching. The embodiments and examples were chosen and described in order to best explain the principles of the invention and its practical application to thereby enable others skilled in the art to best utilize the invention in various embodiments and applications and with various modifications as are suited to the particular use contemplated. It is intended that the scope of the invention be defined by the claims appended hereto.

APPENDIX

Algorithm for the Discrete-Event Simulation of BIP Availability

Step 1. read input
Step 2. build process structure
Step 3. draw initial lane failure times
Step 4. compute buffer/subsystem event times
Step 5. get next event time
Step 6. compute production to next event
Step 7. process next event (remove next event, adjust scheduled events, schedule new events)
Step 8. simulation time exceeds SimulationDuration?
    no - go to Step 4.
    yes - stop
        the following is a detailed description of Step 7
for lane events:
    lane failure
are all lanes in subsystem not working?
    yes - treat subsystem as stopped, schedule subsystem repair event, adjust
        speed/failure times of lanes in other subsystems, speed determined by
        buffer quantities
    no - can we run remaining lanes?
        yes - can we repair on the fly?
            yes - schedule lane repair

APPENDIX-continued

Algorithm for the Discrete-Event Simulation of BIP Availability no - perform decision analysis, do we stop all lanes?
                yes - stop all lanes, schedule subsystem repair event,
                    adjust speed/failure times of lanes in other
                    subsystems, speed determined by buffer
                    quantities
                no - rum remaining lanes, speed up and adjust failure
                    times of lanes in this subsystem, speed
                    determined by buffer quantities
                no - stop all lanes, schedule subsystem repair event, adjust
                    speed/failure times
                    of lanes in other subsystems, speed determined by buffer
                    quantities
lane repair
    can we restart on the fly?
  yes - try to restart subsystem, do we have a successful subsystem restart?
        yes - schedule successful subsystem restart event
        no - schedule unsuccessuful subsystem restart event
  no - if all lanes in the subsystem have been repaired, then perform decision
      analysis, do we stop all lanes?
        yes - stop all lanes, adjust speed/failure times of lanes in other
              subsystems, speed determined by buffer quantities, do we need any
              repair?
              yes - schedule subsystem repair event, adjust speed/failure times of
                  lanes in other subsystems, speed determined by buffer
                  quantities
              no - try to restart subsystem, do we have a successful subsystem
                  restart?
                  yes - schedule successful subsystem restart event
                  no - schedule unsuccessful subsystem restart event
        no - run remaining lanes, speed up and adjust failure times of lanes in this
            subsystem speed determined by buffer quantities
unsuccessful lane restart
    schedule lane repair event
successful lane restart
    draw new failure time
    bring up lane and adjust speed/failure times of other lanes in subsystem
    adjust speed/failure times of lanes in other subsystems
    speed determined by buffer quantities
for subsystem events:
after subsystem repair
do we stop because buffer hit either capacity or empty?
        yes - is the repair completed before the buffer restart limit is hit?
            yes - do not try to restart
            no - try to restart subsystem, do we have a successful subsystem
                restart?
                  yes - schedule successful subsystem restart event
                  no - schedule unsuccessful subsystem restart event
        no - try to restart subsystem, do we have a successful subsystem restart?
                yes - schedule successful subsystem restart event
                no - schedule unsuccessful subsystem restart event
subsystem unsuccessful restart
    schedule subsystem repair event
subsystem successful restart
    draw new failure times for repaired lanes
    draw new failure times for other lanes if not good-as-old
    adjust speed/failure times of lanes in subsystem as brought up
    adjust speed/failure times of lanes in other subsystems
    speed determined by buffer quantities
for buffer events:
InSlow
adjust incoming subsystem to slow speed, adjust failure times
InSlowNormal
adjust incoming subsystem from slow to normal speed, adjust failure times
InFastNormal
adjust incoming subsystem from fast to normal speed, adjust failure times
InFast
adjust incoming subsystem to fast speed, adjust failure times
OutFast
adjust outgoing subsystem to slow speed, adjust failure times
OutFastNormal
adjust outgoing subsystem from fast to normal speed, adjust failure times
OutSlowNormal
adjust outgoing subsystem from slow to normal speed, adjust failure times
OutSlow
adjust outgoing subsystem to slow speed, adjust failure times
HitBufferCapacity

APPENDIX-continued

Algorithm for the Discrete-Event Simulation of BIP Availability buffer hit capacity  
stop incoming subsystem  
start repair of subsystem - schedule subsystem repair events, zero out lane events  
    except failure times  
HitBufferEmpty  
buffer hit empty  
stop outgoing subsystem  
start repair of subsystem - schedule subsystem repair events, zero out lanes events  
    except failure times  
BufferInRestart  
attempt to restart incoming subsystem  
do we have a successful subsystem restart?  
    yes - schedule successful subsystem restart  
    no - schedule unsuccessful subsystem restart  
BufferOutRestart  
attempt to restart outgoing subsystem  
do we have a successful subsystem restart?  
    yes - schedule successful subsystem restart  
    no - schedule unsuccessful subsystem restart

What is claimed is:

1. A computer-implemented process for determining optimum configuration parameters for a buffered industrial process, comprising the steps of:
   initializing a population of a predetermined size by randomly selecting a first set of design and operation values associated with subsystems and buffers of the buffered industrial process to form a set of operating parameters for each member of the population;
   performing an availability discrete event simulation (ADES) on each member of the population to determine a fitness of each member as determined by a product-base availability of each member and selecting a predetermined number of members ranked according to product-based availability to form an initial population;
   mutating the initial population with a genetic algorithm to produce a mutated population;
   evaluating the fitness of each member of the mutated population using ADES to determine the product-based availability;
   forming a new initial population including members having a highest fitness; and
   iterating subsequent population members determined with the genetic algorithm with product-based availability determined by ADES to form improved design and operation values from which the configuration parameters are selected for the buffered industrial process.

2. The process of claim 1, wherein the set of design and operation values associated with subsystems is one or more of the set comprising NoLanes, LaneSpeed, a flag for Uncoupled lanes, and a set of flags denoting LaneRules for LaneRepairOnFly, LaneRestartOnFly, and RunRemainLanes.

3. The process of claim 1, wherein the set of design and operation values associated with buffers is one or mare of the set comprising BufferCapacity; ordered BufferInTriggers for InSlow, InSlowNormal, InFastNormal and InFast; BufferInRestart; BufferOutRestart; order BufferOutTriggers for OutFast, OutFastNormal, OutSlowNormal and OutSlow.

4. The process of claim 1, wherein the step of initializing a population of a predetermined size further includes the step of imposing boundary limits on the set of design and operation values available for each member of the population selected by the genetic algorithm.

5. The process of claim 4, wherein the boundary limits include:
   $MinNoLanes \leq NoLanes \leq MaxNoLanes$;
   $MinUncoupledLanes \leq UncoupledLanes \leq MaxUncoupledLanes$;
   $MinLaneSpeed \leq LaneSlowSpeed \leq LaneNormalSpeed \leq LaneFastSpeed \leq MaxLaneSpeed$; and
   $MinBufferCapacity \leq BufferCapacity \leq Max\ BufferCapacity$.

6. The process of claim 1, wherein the new population has members selected from the set consisting of a first set of members identical to a preceding population; a second set of members obtained by mutating the preceding population; a third set of members obtained by genetic crossover from random sets of the preceding population; and a fourth set of members obtained by randomly selecting a set of design and operation values.

7. The process of claim 1, wherein the step of performing APES on each member of the population includes the following steps:
   establishing a schedule of events for the subsystems and buffers;
   initializing a product output rate during a first event cycle and computing a product output, where an event cycle in a subsystem having n lanes, with only p operating lanes, is the time from a (n−p)th lane failure until the time at which (n−1) lanes are again operating;
   determining a second event cycle and determining the product output rate between the second event cycle, computing the product output and accumulating product output;
   continuing to schedule events and accumulating product output until a determined total simulation time is completed;
   computing the product-based availability of the configuration of subsystems and buffers as the ratio of the accumulated product output over the total simulation time to the total product output that would have resulted in an absence of events associated with subsystem failures.

8. The process of claim 7, wherein the step of determining the product output rate during an event cycle includes the steps of:
   determining a product output rate during the event cycle where operating condition is that remaining operating lanes are stopped after an (n−p)th lane failure and failed lanes repaired;

determining a product output rate during the event cycle where the operating condition is that the remaining lanes continue to operate without stopping until the next lane failure occurs; and selecting the operating condition for the event cycle having the highest product output.

9. The process of claim 8, further including the step of processing the schedule of events to account for the operating condition selected for an event cycle.

10. A computer-implemented process for evaluating the fitness of a buffered industrial process performed by a configuration of subsystems and buffers, comprising the steps of:

collecting statistical operating information on a running buffered industrial process to establish scale and shape parameters for probability density functions associated with operating parameters of subsystems of the buffered industrial process;

defining design and operation values and operating rules associated with a new buffered industrial process that is expected to operate statistically in a manner related to the running buffered industrial process;

establishing a schedule of events for the subsystems and buffers;

initializing a product output rate during a first event cycle and compute a product output, where an event cycle in a subsystem having n lanes, with only p operating lanes, is the time from a (n−p)th lane failure until the time at which (n−1) lanes are again operating;

determining a second event cycle and determining the product output rate between the second event cycle, computing the product output and accumulating product output;

continuing to schedule events and accumulating product output until a determined total simulation time is completed;

computing the product-based availability of the configuration of subsystems and buffers as the ratio of the accumulated product output over the total simulation time to the total product output that would have been resulted in an absence of events associated with subsystem failures.

11. The process of claim 10, wherein the step of determining the product output rate during an event cycle includes the steps of:

determining a product output rate during the event cycle where operating condition is that remaining operating lanes are stopped after an (n−p)th lane failure and failed lanes repaired;

determining a product output rate during the event cycle where the operating condition is that the remaining lanes continue to operate without stopping until the next lane failure occurs; and selecting the operating condition for the event cycle having the highest product output.

12. The process of claim 11, further including the step of processing the schedule of events to account for the operating condition selected for an event cycle.

13. A computer implemented genetic process for defining sets of design and operation values associated with each one of individual buffered industrial processes that form a population set whose fitness is to be evaluated, comprising the steps of:

forming an initial population set having members with sets of design and operation values that are randomly selected from available values;

performing a first fitness evaluation of the product-based availability of each member of the initial population set;

forming a second population set having members selected from a first set of members identical to the initial population set; a second set of members obtained by mutating the initial population set; a third set of members obtained by genetic crossover from random pairs of the initial population; and a fourth set of members obtained by randomly selecting design and operation values from the available values;

performing a second fitness evaluation of the product-based availability of each member of the second population set;

selecting a number of members of the second population set having the highest fitness evaluation to form a new initial population set; and continuing to perform fitness evaluations and form new population sets until a stop decision is made.

14. The process of claim 13, wherein the set of design and operation values associated with subsystems is one or more of the set comprising NoLanes, LaneSpeed, a flag for Uncoupled lanes, and a set of flags denoting LaneRules for LaneRepairOnFly, LaneRestartOnFly, and RunRemainLanes.

15. The process of claim 13, wherein the set of design and operation values associated with buffers is one or more of the set comprising BufferCapacity; ordered BufferInTriggers for InSlow, InSlowNormal, InFastNormal and InFast; BufferInRestart; BufferOutRestart; order BufferOutTriggers for OutFast, OutFastNormal, OutSlowNormal and OutSlow.

16. The process of claim 13, wherein the step of initializing a population of a predetermined size further includes the step of imposing boundary limits on the set of design and operation values available for each member of the population selected by the genetic algorithm.

17. The process of claim 16, wherein the boundary limits include:

$MinNoLanes \leq NoLanes \leq MaxNoLanes$;
$MinUncoupledLanes \leq UncoupledLanes \leq MaxUncoupledLanes$;
$MinLaneSpeed \leq LaneSlowSpeed \leq LaneNormalSpeed \leq LaneFastSpeed \leq MaxLaneSpeed$; and
$MinBufferCapacity \leq BufferCapacity \leq MaxBufferCapacity$.

* * * * *